(12) United States Patent
Wright et al.

(10) Patent No.: US 11,303,580 B2
(45) Date of Patent: Apr. 12, 2022

(54) IMPLEMENTING NETWORK CONSTRAINT EXCEPTIONS ON A PER DEVICE BASIS

(71) Applicant: Charter Communications Operating, LLC, St. Louis, MO (US)

(72) Inventors: Ethan Wright, Denver, CO (US); Matthew J. Wright, Denver, CO (US); Tyson Vinson, Denver, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 36 days.

(21) Appl. No.: 16/839,913

(22) Filed: Apr. 3, 2020

(65) Prior Publication Data
US 2021/0314275 A1    Oct. 7, 2021

(51) Int. Cl.
*H04L 12/917* (2013.01)
*H04L 47/76* (2022.01)
*H04L 47/72* (2022.01)
*H04L 47/80* (2022.01)
*H04L 12/66* (2006.01)
(Continued)

(52) U.S. Cl.
CPC ............. *H04L 47/76* (2013.01); *H04L 12/66* (2013.01); *H04L 47/72* (2013.01); *H04L 47/808* (2013.01); *H04L 47/781* (2013.01); *H04L 47/805* (2013.01); *H04L 47/824* (2013.01)

(58) Field of Classification Search
CPC ....... H04L 47/76; H04L 47/72; H04L 47/808; H04L 12/66; H04L 47/805; H04L 47/781; H04L 47/824
See application file for complete search history.

(56) References Cited

U.S. PATENT DOCUMENTS

| 2004/0196848 | A1* | 10/2004 | Wang | H04L 47/803 370/395.2 |
| 2012/0215852 | A1* | 8/2012 | Chen | H04L 51/12 709/206 |

(Continued)

OTHER PUBLICATIONS

Author Unknown, "Bandwidth on Demand, Maximize Network Infrastructure Monetization with Bandwidth on Demand," 4 pages, Sterlite Technologies Limited, https://www.stl.tech/bandwidth-on-demand.html, accessed Feb. 5, 2020.

(Continued)

*Primary Examiner* — Kiet Tang
(74) *Attorney, Agent, or Firm* — Withrow & Terranova, PLLC

(57) ABSTRACT

Implementing network constraint exceptions on a per device basis is disclosed. A network manager determines that a subscriber device associated with a subscriber network is to be granted an exception to a network constraint of the subscriber network. An aggregation device that is coupled to a set of subscriber networks including the subscriber network is sent aggregation device instructions to grant the exception to packets associated with the subscriber device that flow through the aggregation device. A network gateway device that serves as a network gateway for the subscriber network is sent gateway device instructions to associate packets associated with the subscriber device with information for identifying the packets as being associated with the subscriber device.

16 Claims, 13 Drawing Sheets

(51) Int. Cl.
　　　*H04L 47/70*　　　(2022.01)
　　　*H04L 47/78*　　　(2022.01)

(56) References Cited

U.S. PATENT DOCUMENTS

2016/0013985 A1* 1/2016 Reddy ................. H04L 41/5003
　　　　　　　　　　　　　　　　　　　726/4
2017/0180499 A1* 6/2017 Gelfenbeyn ............ H04L 51/02

OTHER PUBLICATIONS

Author Unknown, "Bandwidth on Demand, Self-service bandwidth management to lower labor efforts and satisfy customers," 2 pages, Netka System, https://netkasystem.com/product/network-management/bandwidth-on-demand, accessed Feb. 5, 2020.

\* cited by examiner

IMPLEMENTING NETWORK CONSTRAINT EXCEPTIONS ON A PER DEVICE BASIS

BACKGROUND

Residences and business enterprises typically obtain public networking capabilities, such as an ability to access the Internet, from a service provider.

SUMMARY

The embodiments disclosed herein provide mechanisms for implementing temporary exceptions to network constraints in a subscriber network on a per device basis. In particular, the embodiments allow a subscriber to identify a particular subscriber device and request that an exception be granted to a network constraint of a network to which the subscriber device is connected. The embodiments maintain normal network constraints for other subscriber devices on the network.

In one embodiment a method is provided. The method includes determining, by a network manager executing on a computing device, that a subscriber device associated with a first subscriber network of a plurality of subscriber networks is to be granted an exception to a network constraint of the first subscriber network. The method further includes sending, to an aggregation device that is coupled to a set of subscriber networks including the first subscriber network, aggregation device instructions to grant the exception to packets associated with the subscriber device that flow through the aggregation device. The method further includes sending, to a network gateway device that serves as a network gateway for the first subscriber network, gateway device instructions to associate packets associated with the subscriber device with information for identifying the packets as being associated with the subscriber device.

In another embodiment a computing device is provided. The computing device includes a memory, and a processor device coupled to the memory. The processor device is configured to determine that a subscriber device associated with a first subscriber network of a plurality of subscriber networks is to be granted an exception to a network constraint of the first subscriber network. The processor device is further configured to send, to an aggregation device that is coupled to a set of subscriber networks including the first subscriber network, aggregation device instructions to grant the exception to packets associated with the subscriber device that flow through the aggregation device. The processor device is further configured to send, to a network gateway device that serves as a network gateway for the first subscriber network, gateway device instructions to associate packets associated with the subscriber device with information for identifying the packets as being associated with the subscriber device.

In another embodiment a computer program product is provided. The computer program product is stored on a non-transitory computer-readable storage medium and includes instructions configured to cause a processor device to determine that a subscriber device associated with a first subscriber network of a plurality of subscriber networks is to be granted an exception to a network constraint of the first subscriber network. The instructions are further configured to cause the processor device to send, to an aggregation device that is coupled to a set of subscriber networks including the first subscriber network, aggregation device instructions to grant the exception to packets associated with the subscriber device that flow through the aggregation device. The instructions are further configured to cause the processor device to send, to a network gateway device that serves as a network gateway for the first subscriber network, gateway device instructions to associate packets associated with the subscriber device with information for identifying the packets as being associated with the subscriber device.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
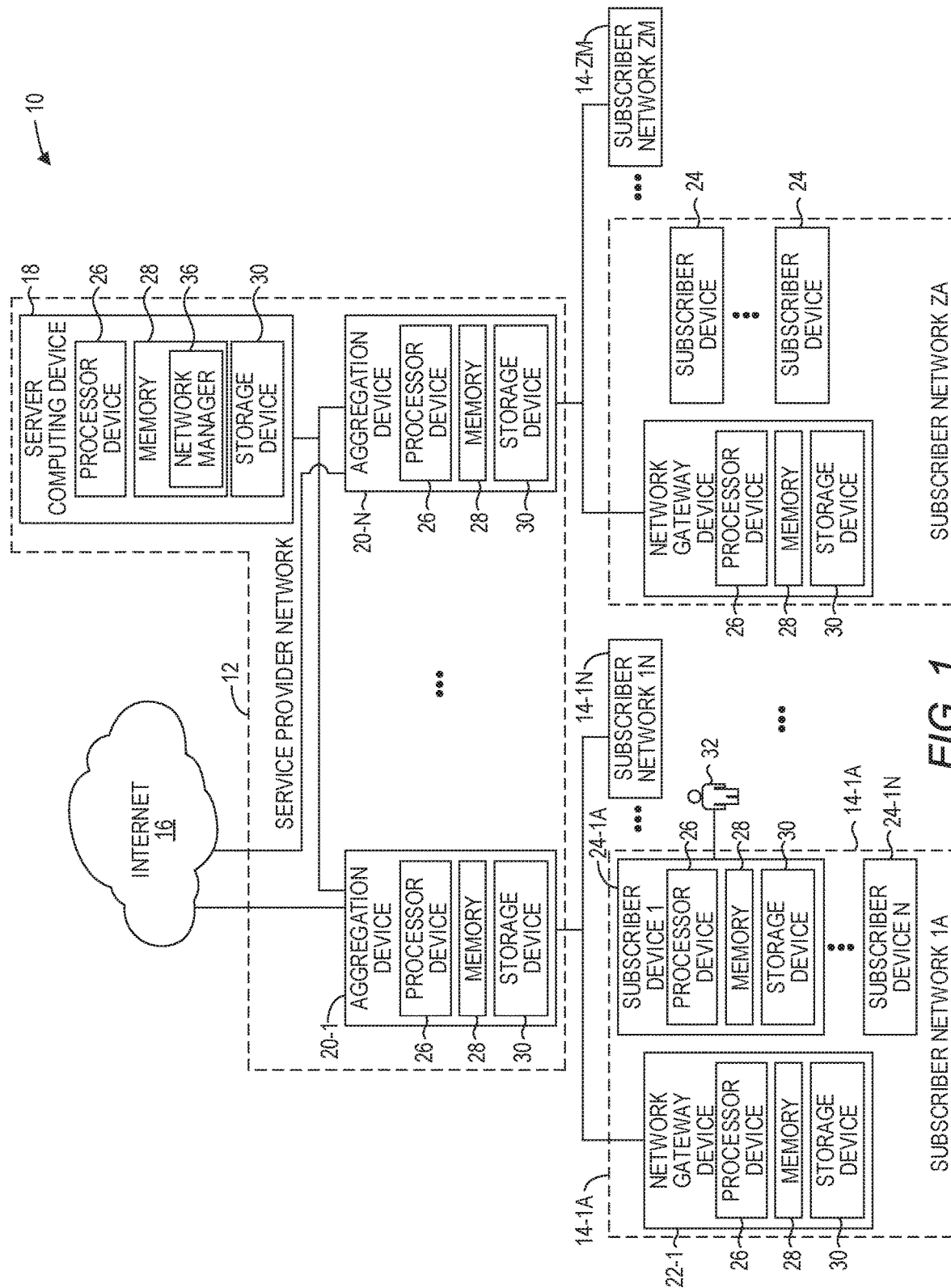
FIG. 1 is a block diagram of a system illustrating certain aspects of various embodiments disclosed herein.

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Residences and business enterprises, generally referred to as subscribers, often obtain public networking capabilities, such as an ability to access the Internet, from a service provider. Often a service provider offers various networking packages for different fees. A package that includes a first amount of bandwidth, such as 100 megabits per second (Mbps), may be priced at a lower monthly fee than a package that includes a greater amount of bandwidth, such as 250 Mbps. Circumstances may arise where a temporary increase in bandwidth might be useful and/or desirable to a subscriber, and the subscriber may be willing to pay an additional fee for the temporary increase in bandwidth. As an example, a subscriber who has a 100 Mbps bandwidth package may have a long overseas flight departing soon and, prior to departing for the airport, may wish to download a substantial amount of video content onto a computing tablet for viewing during the flight. The amount of video content, given the 100 Mbps constraint, may require 45-60 minutes of download time. The subscriber would be willing, if available, to pay a fee to temporarily increase the bandwidth for his computing tablet to 500 Mbps to reduce the download time.

The embodiments disclosed herein provide mechanisms for implementing temporary exceptions to network constraints in a subscriber network on a per device basis. In one embodiment, a subscriber can identify a particular subscriber device and request that an exception be granted to a network constraint of a network to which the subscriber device is connected. In other embodiments, the exceptions may be granted automatically based on some criteria, such as a connection of a subscriber device having a predetermined characteristic. The embodiments maintain normal network constraints for other subscriber devices on the network.

FIG. 1 is a block diagram of a system 10 illustrating certain aspects of various embodiments disclosed herein. The system 10 includes a service provider network 12 that provides networking services to a plurality of subscriber networks 14-1A-14-ZM (generally, subscriber networks 14). The service provider network 12 may service tens, hundreds, thousands, or millions of subscriber networks 14 over vast geographic distances. The subscriber networks 14 may comprise residential networks, enterprise networks, government networks, and the like. The service provider network 12 provides various services to the subscriber networks 14, such as an ability to communicate with devices outside of their respective subscriber network 14 and the ability to communicate with entities via the Internet 16.

The service provider network 12 includes one or more server computing devices 18 (only one illustrated) and a plurality of aggregation devices 20-1-20-N (generally, aggregation devices 20). The service provider network 12 may include tens, hundreds, or thousands of aggregation devices 20. Each aggregation device 20 is communicatively coupled to a set of one or more subscriber networks 14. Each aggregation device 20 processes all data received from the subscriber networks 14 that has a destination outside of the respective subscriber network 14. Each aggregation device 20 also processes all data originating outside of a respective subscriber network 14 that is destined for the respective subscriber network 14. Each aggregation device 20 may implement certain network constraints, such as bandwidth constraints, for each subscriber network 14.

The subscriber network 14-1A is communicatively coupled to the aggregation device 20-1 via a network gateway device 22-1. The network gateway device 22-1 serves as the network gateway for a plurality of subscriber devices 24-1A-24-1N of the subscriber network 14-1A. The network gateway device 22-1 may be identified in each of the subscriber devices 24-1A-24-1N as the default gateway via which the subscriber devices 24-1A-24-1N can communicate with devices that are not on the same subnet as the subscriber network 14-1A. Thus, packets communicated between a subscriber device 24-1A-24-1N and a device outside of the subscriber network 14-1A are processed by the network gateway device 22-1.

Each of the processing devices disclosed herein, such as the server computing device 18, the aggregation devices 20, the network gateway devices 22, and the subscriber devices 24, include a processor device 26, a memory 28, and a storage device 30. Some or all of the processing devices may also include a display device.

The aggregation device 20-1 imposes certain network constraints on the subscriber network 14-1A. For example, the subscriber network 14-1A may have a service package that limits bandwidth of the subscriber network 14-1A to a predetermined bandwidth, such as 250 Mbps. Thus, irrespective of how many subscriber devices 24-1A-24-1N are concurrently receiving data from devices outside of the subscriber network 14-1A, the aggregate concurrent bandwidth will not exceed 250 Mbps.

A user 32 of the subscriber device 24-1A desires a temporary exception to the network constraint of bandwidth enforced by the aggregation device 20-1 on the subscriber network 14-1A. In particular, the user 32 desires a greater amount of bandwidth than 250 Mbps at a future point in time to download a large file from the Internet 16. The user 32 accesses, via the subscriber device 24-1A, a user interface that facilitates obtaining exceptions to network constraints and requests that the service provider network 12, at a designated date and time, grant the subscriber device 24-1A an exception to the 250 Mbps bandwidth network constraint imposed on the subscriber network 14-1A and instead provide a 600 Mbps bandwidth network constraint to the subscriber device 24-1A for a predetermined period of time. The user 32 may agree to pay a fee to obtain this exception.

In response to the request, a network manager 36, executing on the server computing device 18, determines that the subscriber device 24-1A is connected to the subscriber network 14-1A. The network manager 36 sends, to the aggregation device 20-1, aggregation device instructions to grant the exception to packets associated with the subscriber device 24-1A that flow through the aggregation device 20-1.

The network manager 36 also sends, to the network gateway device 22-1, gateway device instructions that identify the designated date, time and predetermined period of time, and that instruct the network gateway device 22-1 to, at the designated date and time, and for the predetermined period of time, associate packets associated with the subscriber device 24-1A with information for identifying the packets as being associated with the subscriber device 24-1A. In this manner, the aggregation device 20-1 can distinguish packets associated with the subscriber device 24-1A from packets associated with all other subscriber devices 24 of the subscriber network 14-1A and provide such packets with the greater bandwidth.

For the period of time, the subscriber device 24-1A is granted the exception to the bandwidth constraint of 250 Mbps, and instead is provided a 600 Mbps bandwidth by the aggregation device 20-1. All other subscriber devices 24 of the subscriber network 14-1A have an aggregate bandwidth constraint of 250 Mbps. When the designated period of time ends, the network gateway device 22-1 stops associating packets that are associated with the subscriber device 24-1A with information for identifying the packets as being associated with the subscriber device 24-1A. Thereafter, the subscriber device 24-1A is limited to the 250 Mbps aggregate bandwidth constraint of the subscriber network 14-1A.

It is noted that, because the network manager 36 is a component of the server computing device 18, functionality implemented by the network manager 36 may be attributed to the server computing device 18 generally. Moreover, in examples where the network manager 36 comprises software instructions that program the processor device 26 of the server computing device 18 to carry out functionality discussed herein, functionality implemented by the network manager 36 may be attributed herein to the processor device 26 of the server computing device 18.

Figure 2:
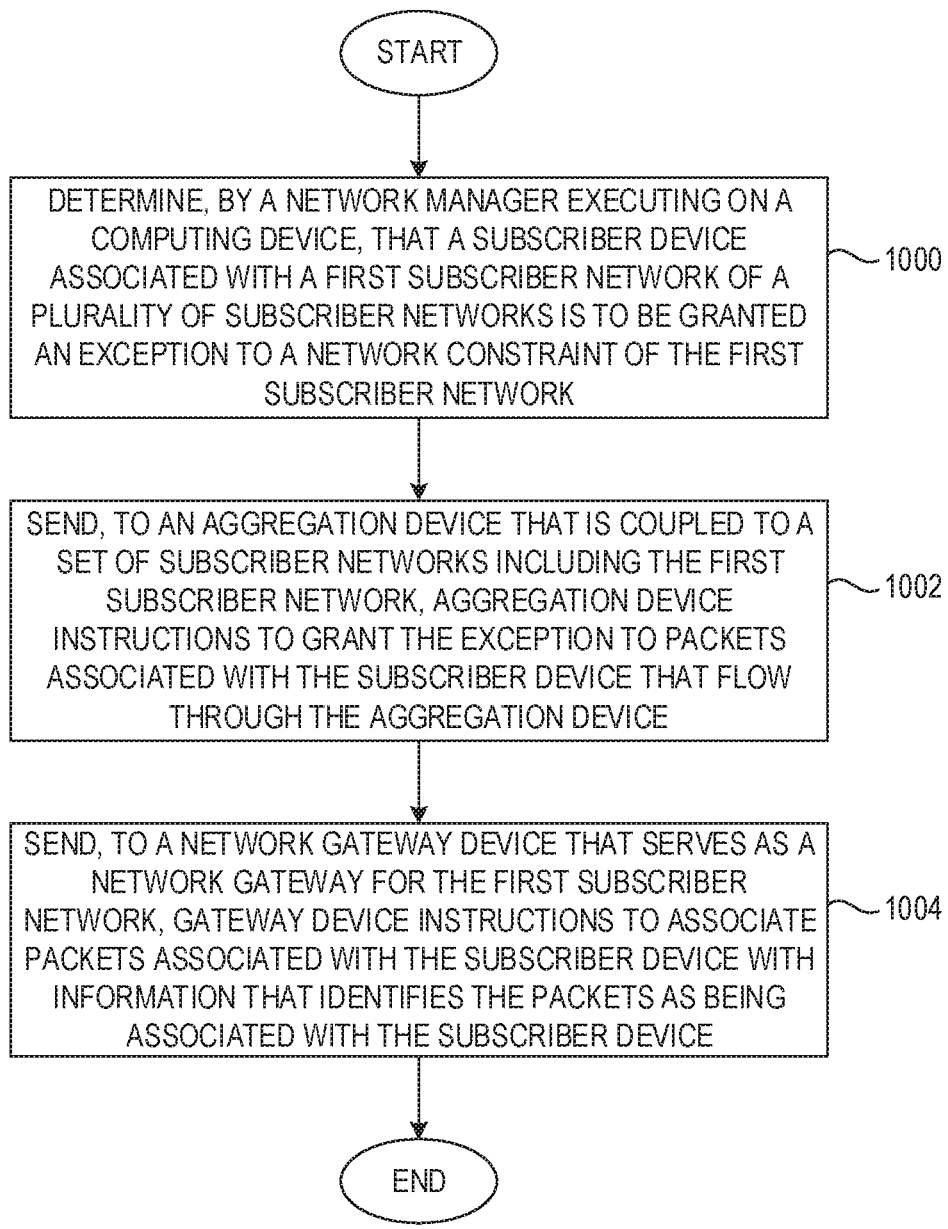
FIG. 2 is a flowchart of a method for implementing network constraint exceptions on a per device basis according to one embodiment.

FIG. 2 is a flowchart of a method for implementing network constraint exceptions on a per device basis according to one embodiment. FIG. 2 will be discussed in conjunction with FIG. 1. The network manager 36 determines that the subscriber device 24-1A associated with the subscriber network 14-1A of the plurality of subscriber networks 14-1A-14-ZM is to be granted an exception to a network constraint of the subscriber network 14-1A (FIG. 2, block 1000). The network manager 36 sends, to the aggregation device 20-1 that is coupled to the set of subscriber networks 14-1A-14-1N, aggregation device instructions to grant the exception to packets associated with the subscriber device 24-1A that flow through the aggregation device 20-1 (FIG. 2, block 1002). The network manager 36 sends, to the network gateway device 22-1 that serves as a network gateway for the subscriber network 14-1A, gateway device instructions to associate the packets associated with the subscriber device 24-1A with information for identifying the packets as being associated with the subscriber device 24-1A (FIG. 2, block 1004). In this manner, the aggregation device 20-1 can except packets associated with the subscriber device 24-1A from the network constraint associated with the subscriber network 14-1A. For example, the aggregation device 20-1 may give packet flows carrying the packets associated with the subscriber device 24-1A a greater bandwidth.

Figure 3:
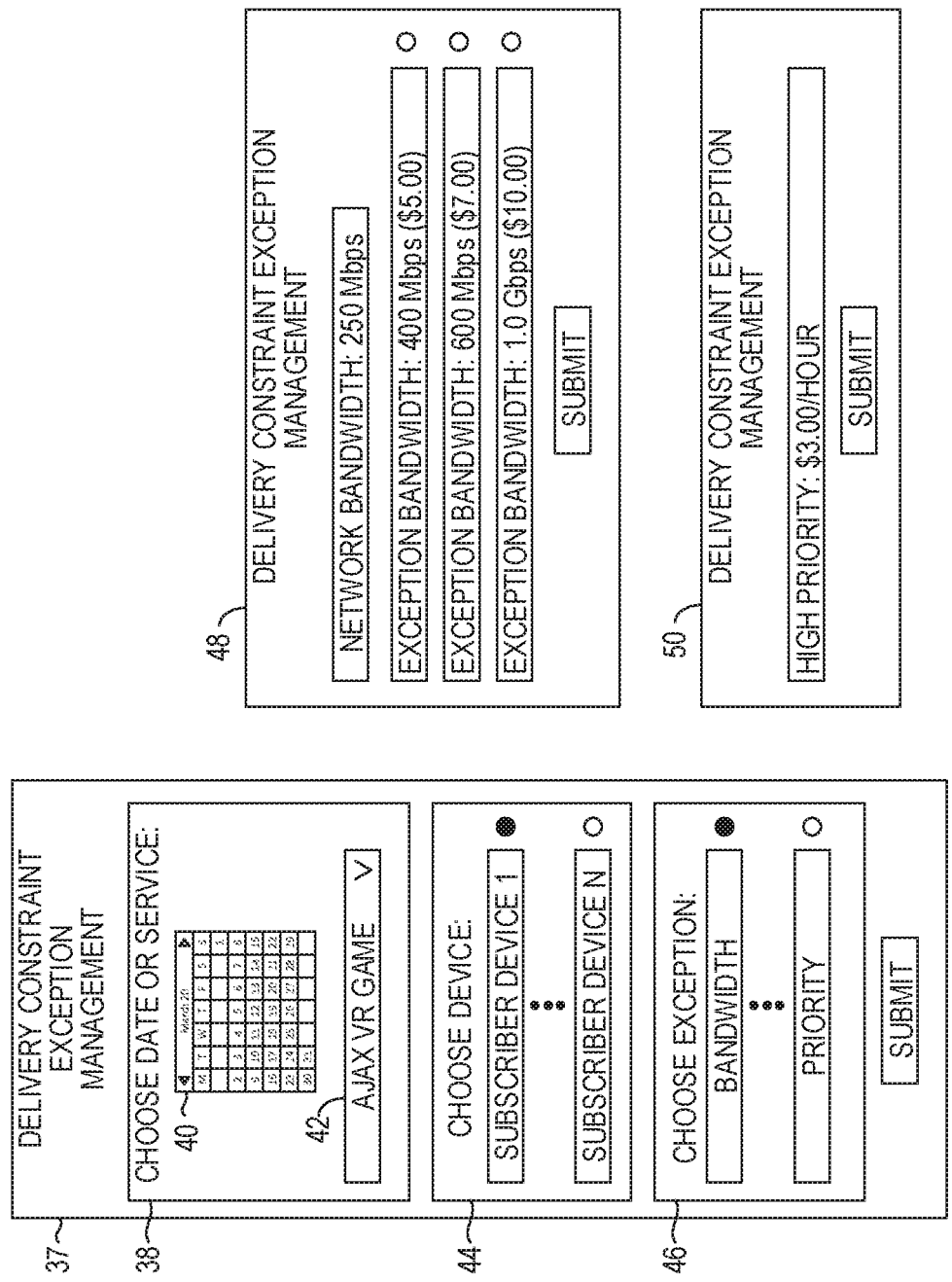
FIG. 3 is a diagram of a user interface suitable for requesting an exception to a network constraint of a subscriber network, according to one embodiment.

FIG. 3 is a diagram of a user interface 37 suitable for requesting an exception to a network constraint of a subscriber network 14, according to one embodiment. FIG. 3 will be discussed in conjunction with FIG. 1. For purposes of illustration, assume that the user 32 wishes to be granted an exception from a network constraint associated with the subscriber network 14-1A. The user 32 may initiate, via the subscriber device 24-1A, a delivery constraint exception management function associated with the service provider network 12. The delivery constraint exception management function may be implemented via an application that is downloadable from the service provider network 12, via a web application to which the user 32 may traverse, or via any other desirable mechanism. Solely for purposes of illustration, it will be assumed that the network manager 36 implements the functionality described herein; however, it will be apparent that so long as the relevant information is obtained and stored in an appropriate location, the user interface 37 may be implemented in any number of ways by the service provider network 12.

In response to some input from the user 32, the network manager 36 causes the user interface 37 to be presented on a display device of the subscriber device 24-1A. The user interface 37 includes a triggering event box 38 that allows the user 32 to select what triggers the exception to the network constraint. In this example, the user 32 can select a date and time via a calendar control 40 to identify a particular date and time that the exception is to be granted. The calendar control 40 may also be used to identify the period of time for which the exception is to be granted, such as 30 minutes, 1 hour, 2 hours, or the like. Alternatively, the user 32 may utilize a dropdown control 42 to indicate that the exception should be granted when the identified subscriber device 24 is communicating with a particular service, such as a virtual reality (VR) gaming service, an online streaming service, or the like, and should be granted for as long as the identified subscriber device 24 is communicating with the selected service.

The user interface 37 may also include a device control 44 that allows the user 32 to select any of the subscriber devices 24-1A-24-1N associated with the subscriber network 14-1A to be granted the exception. In some embodiments, the service provider network 12 may maintain configuration data that identifies each of the subscriber devices 24 associated with each of the subscriber networks 14, and utilize this information to generate the device control 44.

The user interface 37 may include an exception control 46 that allows the user 32 to designate the particular exception to the network constraint desired by the user 32. In this example, the user 32 may designate a bandwidth exception or a priority exception. The bandwidth exception grants an exception to the predetermined bandwidth constraint associated with the subscriber network 14-1A. The priority exception grants the packets associated with the selected subscriber device 24 a higher processing priority by the aggregation device 20-1, thereby reducing latency of such packets. This may be desirable when interacting with certain services, such as a virtual reality service, or an online gaming service, or the like.

Upon selection of the bandwidth exception, a dialog box 48 may be presented. The dialog box 48 identifies the predetermined bandwidth constraint associated with the subscriber network 14-1A, and allows the user 32 to select one or more greater bandwidths. The dialog box 48 may indicate fees associated with the greater bandwidths. The fees may be based on the particular date, time and duration identified by the user 32 via the calendar control 40. For example, if the exception is desired during a time frame when the service provider network 12 typically experiences high usage, the fees may be greater than if the exception is desired during a time frame when the service provider network 12 typically experiences low usage. If, alternatively, the user 32 selects the priority exception, a dialog box 50 may be presented that identifies a fee associated with the priority exception.

After completing and submitting the user interface 37, the network manager 36 may store the information. The network manager 36 sends to the aggregation device 20-1 the aggregation device instructions to grant the exception to packets associated with the subscriber device 24-1A (if the subscriber device 24-1A is the selected subscriber device), and sends to the network gateway device 22-1 the gateway device instructions to associate packets associated with the subscriber device 24-1A with information for identifying the packets as being associated with the subscriber device 24-1A, at the designated date and time, and for the predetermined period of time. Alternatively, if the user 32 selects the dropdown control 42 and identifies a particular service, then the gateway device instructions identify the particular service (e.g., application, web site, domain name, IP address, or the like).

Figure 4:
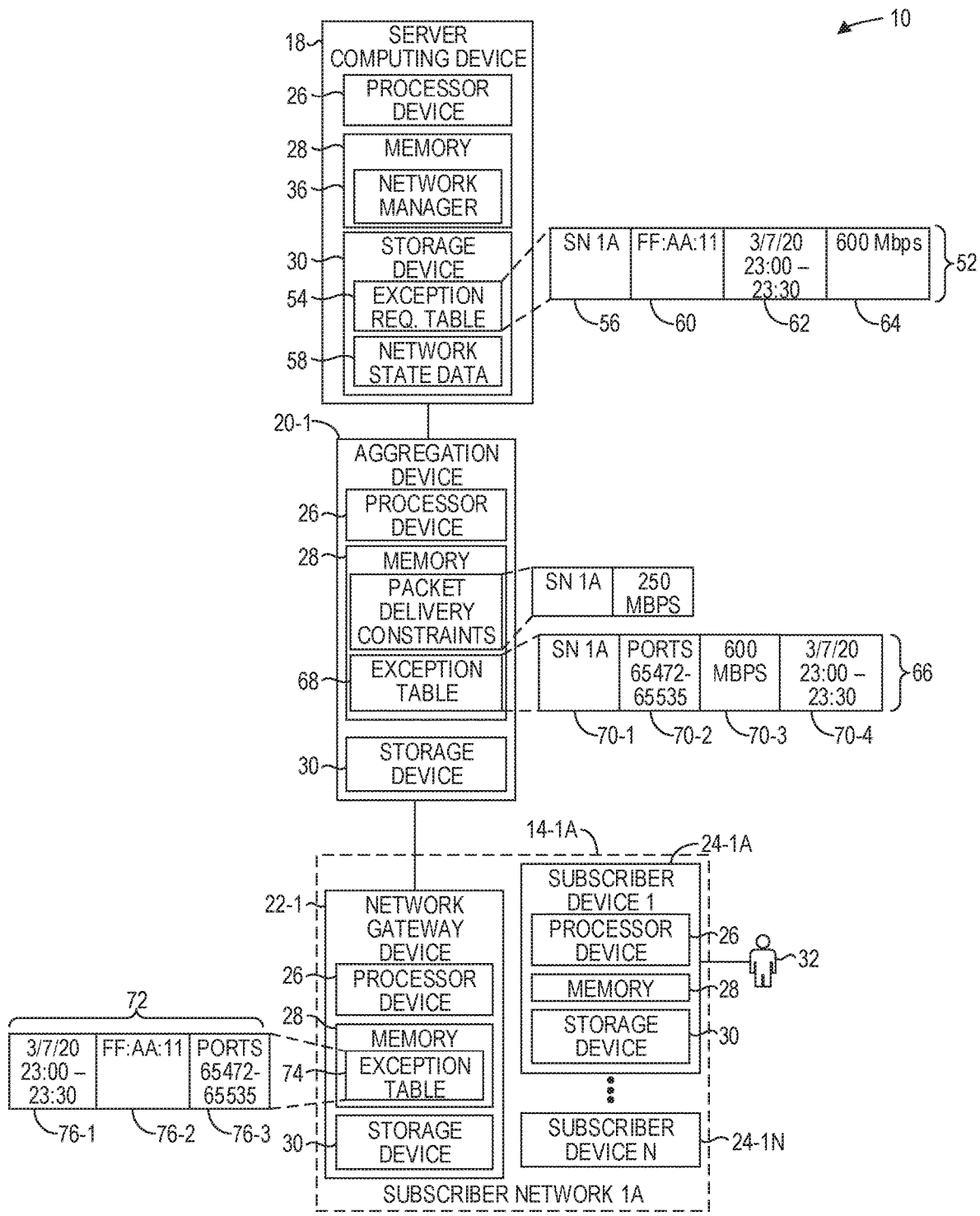
FIG. 4 is a simplified block diagram of the environment illustrated in FIG. 1 at a point in time when an exception to a network constraint is being granted according to one embodiment.
Figure 5A:
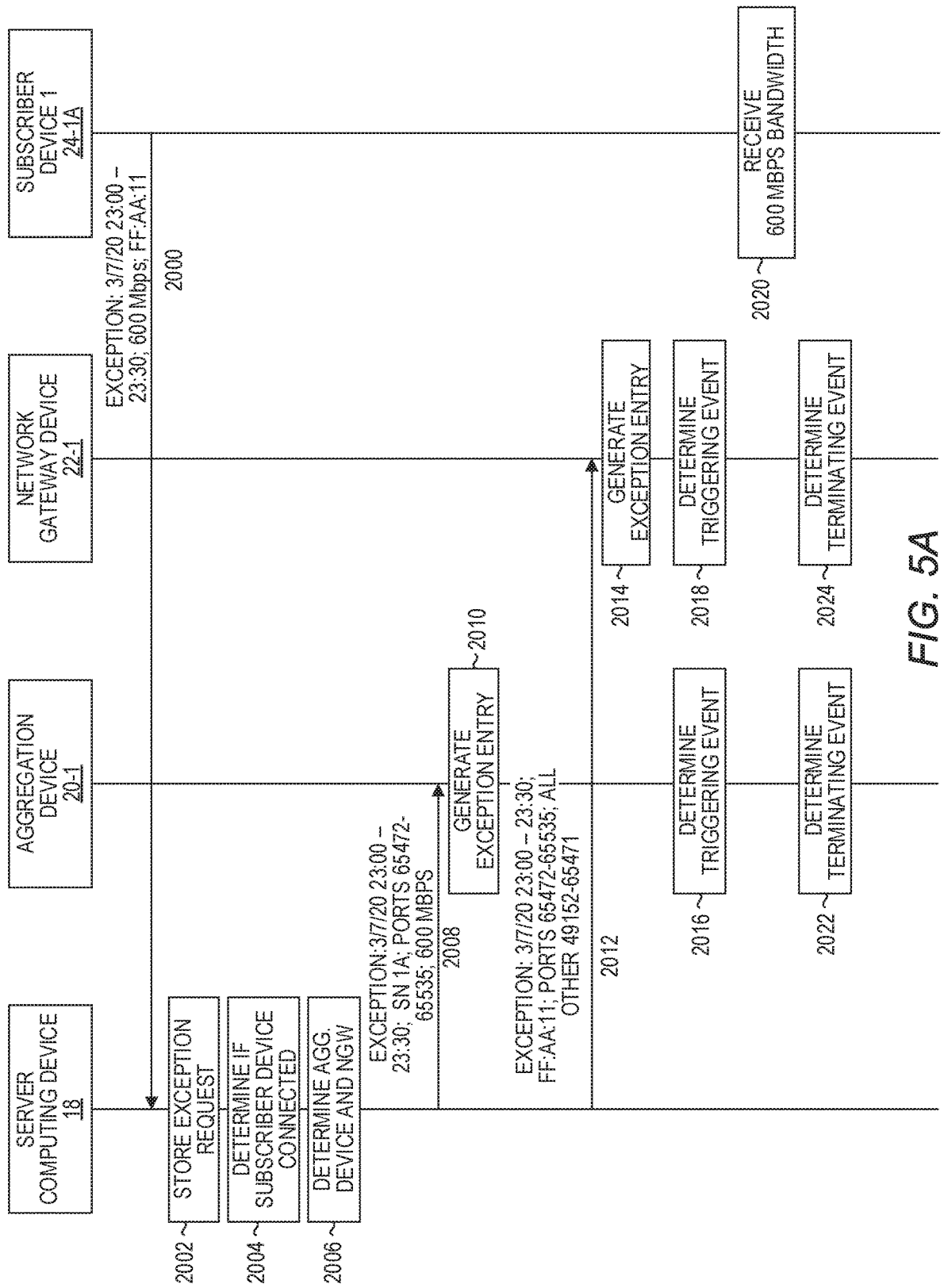
FIGS. 5A-5B illustrate a message flow diagram of a sequence of messages communicated among various components illustrated in FIG. 4, and actions taken by such components, according to one embodiment.
Figure 5B:
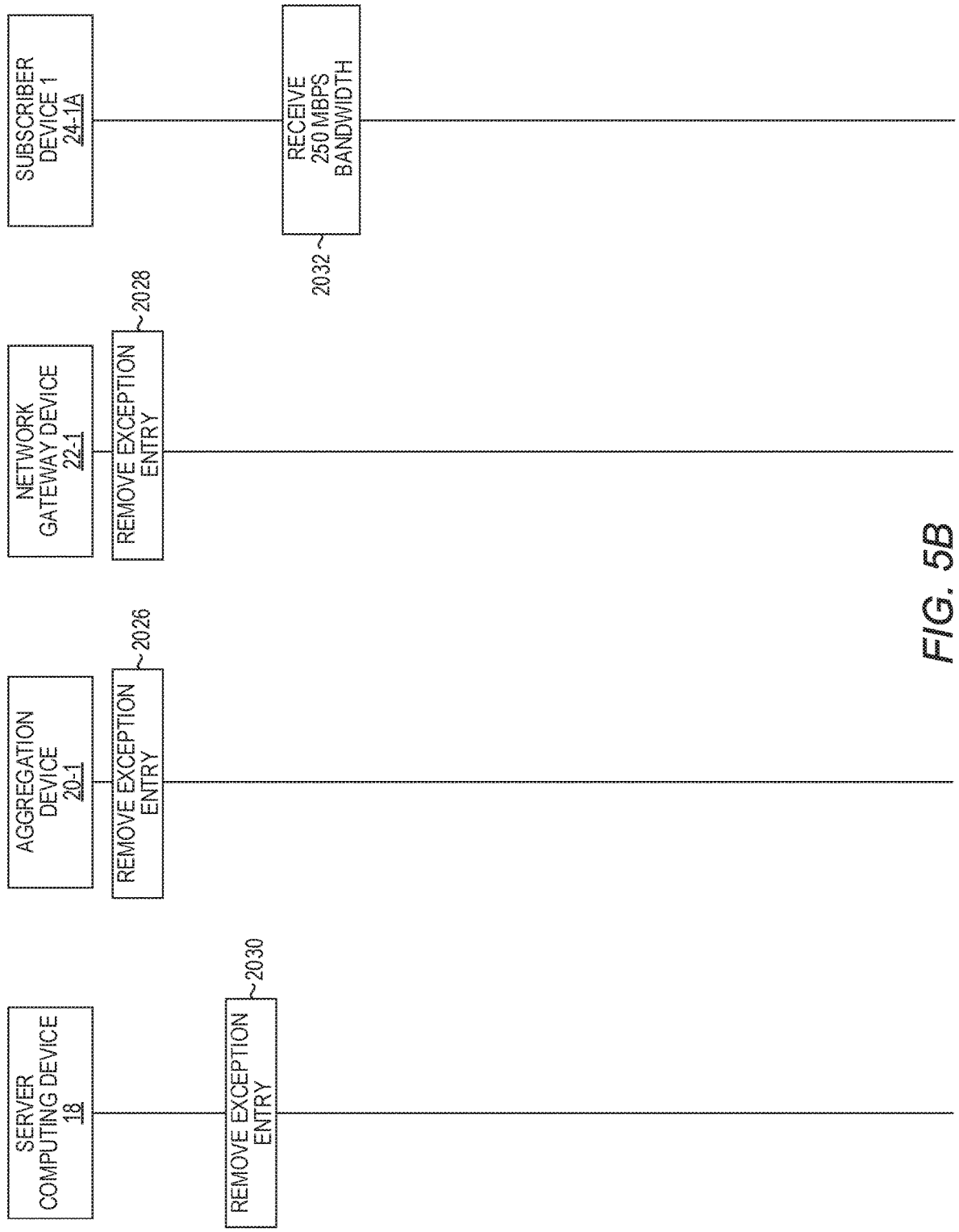

FIG. 4 is a simplified block diagram of the system 10 at a point in time when an exception to a network constraint is being granted according to one embodiment. All devices except the server computing device 18, the aggregation device 20-1, and those in the subscriber network 14-1A have been omitted from FIG. 4 solely due to space considerations. FIGS. 5A-5B illustrate a message flow diagram of a sequence of messages communicated among various components illustrated in FIG. 4, and actions taken by such components according to one embodiment. FIGS. 5A-5B will be discussed in conjunction with FIG. 4.

Referring first to FIG. 5A, assume that the user 32 utilizes the user interface 37 (FIG. 3) to request that an exception be granted to a network constraint at a future point in time and for a predetermined period of time for a particular subscriber device 24. In particular, in this example, the user 32 has requested that the subscriber device 24-1A be granted an exception from a 250 Mbps predetermined aggregate bandwidth constraint that is normally imposed upon the subscriber network 14-1A. The user 32 has requested, via the user interface 37, that this exception be granted at 11:00 PM on Mar. 7, 2020 for 30 minutes, and has requested that the subscriber device 24-1A be granted a bandwidth of 600 Mbps for that period of time. The subscriber device 24-1A sends the exception request to the server computing device 18 (FIG. 5A, block 2000). The exception request identifies the future point in time, the requested duration, the requested bandwidth, and information that identifies the subscriber device 24-1A, such as, by way of non-limiting example, the media access control (MAC) address of the subscriber device 24-1A. It will be noted, however, that a MAC address is but one way to identify a particular subscriber device 24 and that, in other embodiments, the service provider network 12 may utilize other criteria that uniquely identify subscriber devices 24.

The server computing device 18 receives the exception request and stores the exception request (FIG. 5A, block 2002). Referring now to FIG. 4, the server computing device 18 stores the exception request as an exception request entry 52 in an exception request table 54. The exception request entry 52 includes a field 56 that identifies the subscriber network 14-1A. The field 56 may identify the subscriber network 14-1A in any desirable manner. In some embodiments, the field 56 contains the IP address of the default network gateway device 22 associated with the particular subscriber network 14, in this example, the IP address of the network gateway device 22-1. The identification of the subscriber network 14-1A may be determined by the server computing device 18 by accessing network state data 58 that, among other information, identifies for each known subscriber device 24 the subscriber network 14 with which the known subscriber device 24 is associated with. In some embodiments, the user interface 37 may provide information suitable for identifying the particular subscriber network 14-1A, such as the IP address of the network gateway device 22-1.

The exception request entry 52 includes a field 60 that identifies the subscriber device 24-1A as the device that will be granted the exception, a field 62 that identifies the date and period of time during which the exception is to be granted (i.e., Mar. 7, 2020, 23:00-23:30), and a field 64 that identifies the exception that is to be granted (i.e., a bandwidth of 600 Mbps).

Referring now to FIG. 5A, the server computing device 18 accesses information, such as the network state data 58 to determine whether the subscriber device 24-1A is currently connected to a subscriber network 14-1A-14-ZM (FIG. 5A, block 2004). For purposes of illustration, assume that the server computing device 18 determines that the subscriber device 24-1A is currently connected to the subscriber network 14-1A. The server computing device 18 accesses the network state data 58 and determines that the aggregation device 20-1 is the aggregation device for the subscriber network 14-1A and that the network gateway device 22-1 serves as the network gateway for the subscriber network 14-1A (FIG. 5A, block 2006). The server computing device 18 generates aggregation device instructions that include information suitable to identify the subscriber network 14-1A, to identify packets associated with the subscriber device 24-1A, to identify the requested bandwidth, and the designated date, time and timeframe. In this example, the information for identifying the packets comprise a range of port numbers, 65472-65535; however, any suitable information may be utilized, such as packet flow identifiers, differentiated services code points (DSCPs), or the like. The server computing device 18 sends the aggregation device instructions to the aggregation device 20-1 (FIG. 5A, block 2008).

The aggregation device 20-1 receives the aggregation device instructions and generates an exception entry (FIG. 5A, block 2010). In particular, referring again to FIG. 4, the aggregation device 20-1 generates an exception entry 66 and stores the exception entry 66 in an exception table 68 that maintains exceptions to network constraints for the subscriber networks 14 coupled to the aggregation device 20-1. In this example, the exception entry 66 includes a field 70-1 that identifies the subscriber network 14-1A, a field 70-2 that identifies the range of port numbers 65472-65535 that identify packets associated with the subscriber device 24-1A, a field 70-3 that identifies the requested bandwidth, 600 Mbps, and a field 70-4 that identifies the date, time and timeframe. It is noted that in some embodiments, the aggregation device instructions may include two sets of port numbers, a first set of port numbers that identify packets associated with the subscriber device 24-1A, and a second set of port numbers that identify packets associated with every other subscriber device 24 connected to the subscriber network 14-1A other than the subscriber device 24-1A.

Referring now to FIG. 5A, the server computing device 18 generates gateway device instructions to associate packets associated with the subscriber device 24-1A with information for identifying the packets as being associated with the subscriber device 24-1A. In one embodiment, the information may comprise the same set of port numbers provided to the aggregation device 20-1, 65472-65535. The server computing device 18 sends the gateway device instructions to the network gateway device 22-1 (FIG. 5A, block 2012). The network gateway device 22-1 receives the gateway device instructions and generates an exception entry (FIG. 5A, block 2014). In particular, referring again to FIG. 4, the network gateway device 22-1 generates an exception entry 72 and stores the exception entry 72 in an exception table 74. In this example, the exception entry 72 includes a field 76-1 that identifies the date, time and timeframe that the exception is to be granted, a field 76-2 that identifies the subscriber device 24-1A, and a field 76-3 that identifies the range of port numbers 65472-65535 that the network gateway device 22-1 is to use for all packets associated with the subscriber device 24-1A. In some embodiments, the gateway device instructions may include two sets of port numbers, a first set of port numbers that identify packets associated with the subscriber device 24-1A, and a second set of port numbers that identify packets associated with every other subscriber device 24 connected to the subscriber network 14-1A other than the subscriber device 24-1A.

At the designated date and time, both the network gateway device 22-1 and the aggregation device 20-1 determine that the triggering event has occurred based on the designation date and time (FIG. 5A, blocks 2016-2018). Thereafter, the network gateway device 22-1 associates packets of the subscriber device 24-1A with one or more of the port numbers 65472-65535. The aggregation device 20-1 allows all packets from the subscriber network 14-1A that have a port number in the range of 65472-65535 to enjoy a 600 Mbps exception to the 250 Mbps predetermined bandwidth of the subscriber network 14-1A. The aggregation device 20-1 concurrently imposes an aggregate 250. Mbps on all other packet flows from the subscriber network 14-1A utilizing port numbers other than 65472-65535. Referring again to FIG. 5A, the subscriber device 24-1A thus enjoys a 600 Mbps bandwidth for the period of time between 11:00 PM and 11:30 PM (FIG. 5A, block 2020).

At 11:30, both the network gateway device 22-1 and the aggregation device 20-1 determine that a terminating event has occurred due to the lapsing of the predetermined period of time, in this example, thirty minutes (FIG. 5A, blocks 2022-2024). The aggregation device 20-1 removes the exception entry 66 from the exception table 68 and stops providing a bandwidth exception to packets designated with information that associates such packets with the subscriber device 24-1A (FIG. 5B, block 2026). The network gateway device 22-1 removes the exception entry 72 from the exception table 74 (FIG. 5B, block 2028). The server computing device 18 may remove the exception request entry 52 from the exception request table 54 (FIG. 5B, block 2030). Thereafter, the subscriber device 24-1A is limited to the aggregate 250 Mbps bandwidth constraint associated with the subscriber network 14-1A (FIG. 5B, block 2032).

Figure 6:
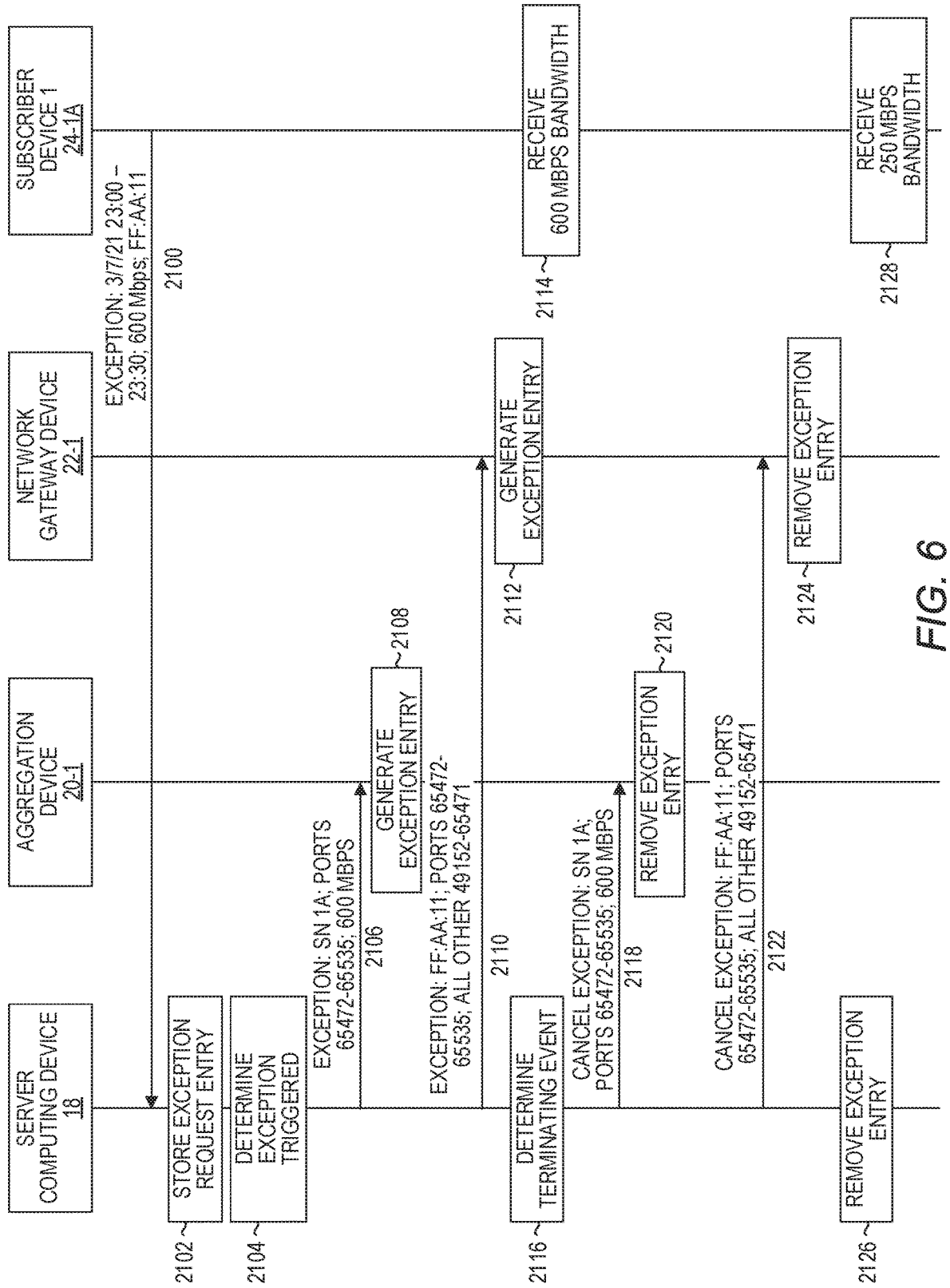
FIG. 6 is a message flow diagram illustrating a sequence of messages communicated among various components illustrated in FIG. 4, and actions taken by such components according to another embodiment.

FIG. 6 is a message flow diagram illustrating a sequence of messages communicated among various components illustrated in FIG. 4, and actions taken by such components according to another embodiment. FIG. 6 will be discussed in conjunction with FIG. 4. In contrast to the process discussed above with regard to FIGS. 5A-5B, in this embodiment, the network manager 36 configures the network gateway device 22-1 and the aggregation device 20-1 at the appropriate time of the requested exception.

Referring to FIG. 6, assume again that the user 32 utilizes the user interface 37 to request that the subscriber device 24-1A be granted an exception from a 250 Mbps predetermined aggregate bandwidth constraint that is normally imposed upon the subscriber network 14-1A. The user 32 has requested, via the user interface 37, that this exception be granted at 11:00 PM on Mar. 7, 2020, for 30 minutes, and has requested that the subscriber device 24-1A be granted a bandwidth of 600 Mbps for that period of time. The subscriber device 24-1A sends the exception request to the server computing device 18 (FIG. 6, block 2100). The exception request identifies the future point in time, the requested duration, the requested bandwidth, and information that identifies the subscriber device 24-1A, such as, by way of non-limiting example, the media access control (MAC) address of the subscriber device 24-1A.

The server computing device 18 receives the exception request and stores the exception request (FIG. 6, block 2102). Referring now to FIG. 4, the server computing device 18 stores the exception request as the exception request entry 52 in the exception request table 54. The exception request entry 52 includes the fields 56, 60, 62 and 64, as described above with regard to FIGS. 5A-5B.

In this embodiment, at the designated future point in time, Mar. 7, 2020, at 11:00 PM, the server computing device 18 determines that the exception request entry 52 has been triggered (FIG. 6, block 2104). This may be accomplished in any number of ways. In some embodiments, the server computing device 18 may periodically, such as every second, every 10 seconds, or any other desired interval, analyze the exception request table 54 to determine if the current time matches the time designated in the field 62 of any exception request entries 52.

In response to determining that the event has been triggered, the server computing device 18 accesses the network state data 58 and determines that the aggregation device 20-1 is the aggregation device for the subscriber network 14-1A. The server computing device 18 may also determine whether the subscriber device 24-1A is currently connected to the subscriber network 14-1A. The server computing device 18 generates aggregation device instructions that include information suitable to identify the subscriber network 14-1A, to identify packets associated with the subscriber device 24-1A, and to identify the requested bandwidth. In this example, the information for identifying the packets comprise a range of port numbers, 65472-65535; however, any suitable information may be utilized, such as packet flow identifiers, differentiated services code points (DSCPs), or the like. The server computing device 18 sends the aggregation device instructions to the aggregation device 20-1 (FIG. 6, block 2106).

The aggregation device 20-1 receives the aggregation device instructions and generates the exception entry 66 and stores the exception entry 66 in the exception table 68 that maintains exceptions to network constraints for the subscriber networks 14 coupled to the aggregation device 20-1. The exception entry 66 includes the fields 70-1, 70-2 and 70-3, as described above with regard to FIGS. 5A-5B. The field 70-4 may be omitted in this embodiment.

Referring again to FIG. 6, the server computing device 18 determines that the network gateway device 22-1 serves as the network gateway for the subscriber network 14-1A. The server computing device 18 generates gateway device instructions to associate packets associated with the subscriber device 24-1A with information for identifying the packets as being associated with the subscriber device 24-1A. The server computing device 18 sends the gateway device instructions to the network gateway device 22-1 (FIG. 6, block 2110). The network gateway device 22-1 receives the gateway device instructions and generates the exception entry 72 and stores the exception entry 72 in the exception table 74. In this example, the exception entry 72 includes the fields 76-2 and 76-3 as described above with regard to FIGS. 5A-5B. The field 76-1 may be omitted in this embodiment.

Thereafter, the network gateway device 22-1 associates packets of the subscriber device 24-1A with one or more of the port numbers 65472-65535. The aggregation device 20-1 allows all packets from the subscriber network 14-1A that have a port number in the range of 65472-65535 to enjoy a 600 Mbps exception to the 250 Mbps predetermined bandwidth of the subscriber network 14-1A. The aggregation device 20-1 concurrently imposes an aggregate 250 Mbps on all other packet flows from the subscriber network 14-1A utilizing port numbers other than 65472-65535. Referring again to FIG. 6, the subscriber device 24-1A thus enjoys a 600 Mbps bandwidth for the period of time between 11:00 PM and 11:30 PM (FIG. 6, block 2114).

At 11:30, the server computing device 18 determines that a terminating event has occurred (FIG. 6, block 2116). In particular, the server computing device 18 determines that the requested period of time has ended. The server computing device 18 sends instructions to the aggregation device 20-1 that revokes the exception (FIG. 6, block 2118). The aggregation device 20-1 removes the exception entry 66 from the exception table 68 (FIG. 6, block 2120). The server computing device 18 sends instructions to the network gateway device 22-1 that revokes the exception (FIG. 6, block 2122). The network gateway device 22-1 removes the exception entry 72 from the exception table 74 (FIG. 6, block 2124). The server computing device 18 may remove the exception request entry 52 from the exception request table 54 (FIG. 6, block 2126). Thereafter, the subscriber device 24-1A is limited to the aggregate 250 Mbps bandwidth constraint associated with the subscriber network 14-1A (FIG. 6, block 2128).

Figure 7:
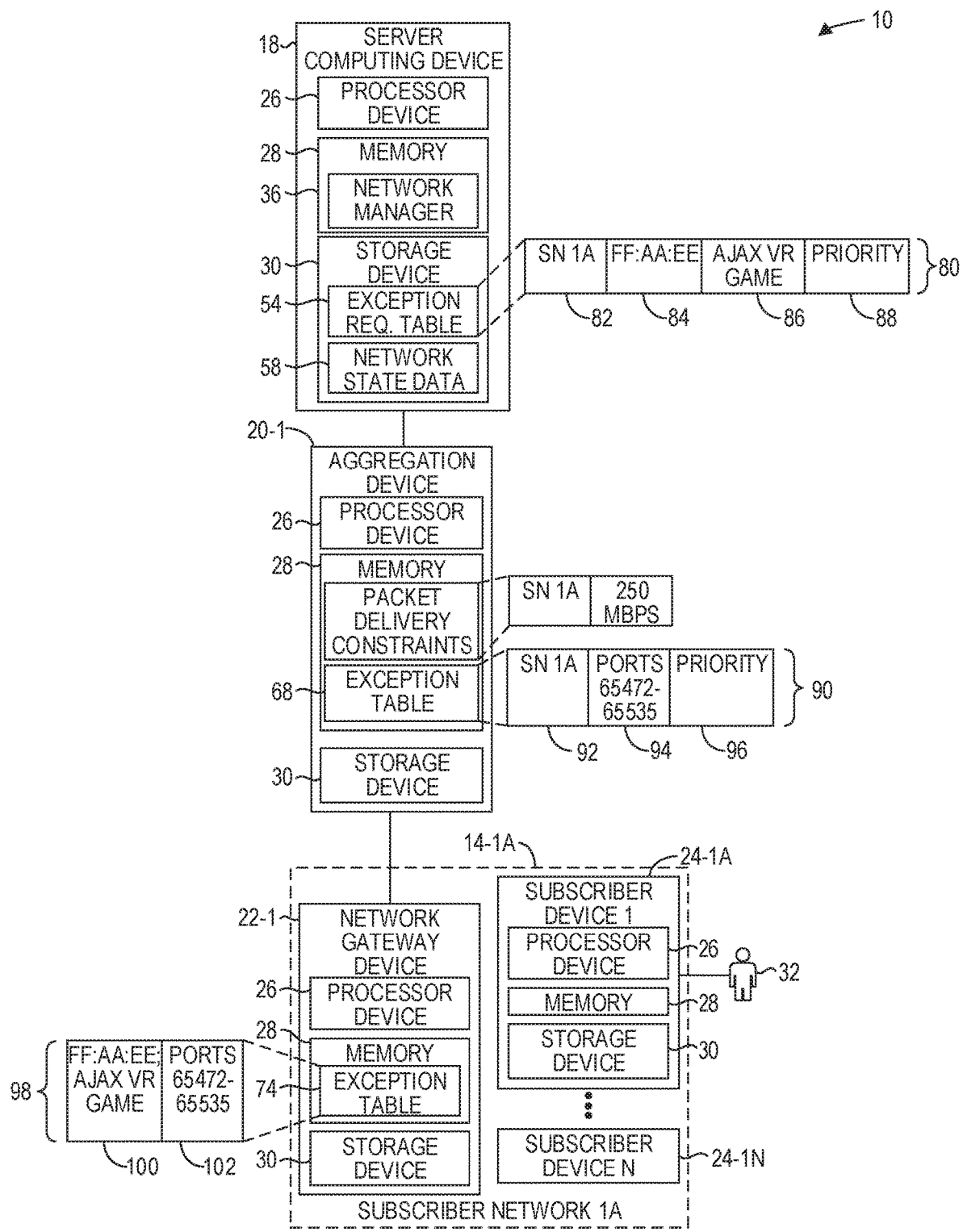
FIG. 7 is a simplified block diagram of the environment illustrated in FIG. 1 at a point in time when an exception to a network constraint is being granted according to another embodiment.
Figure 8:
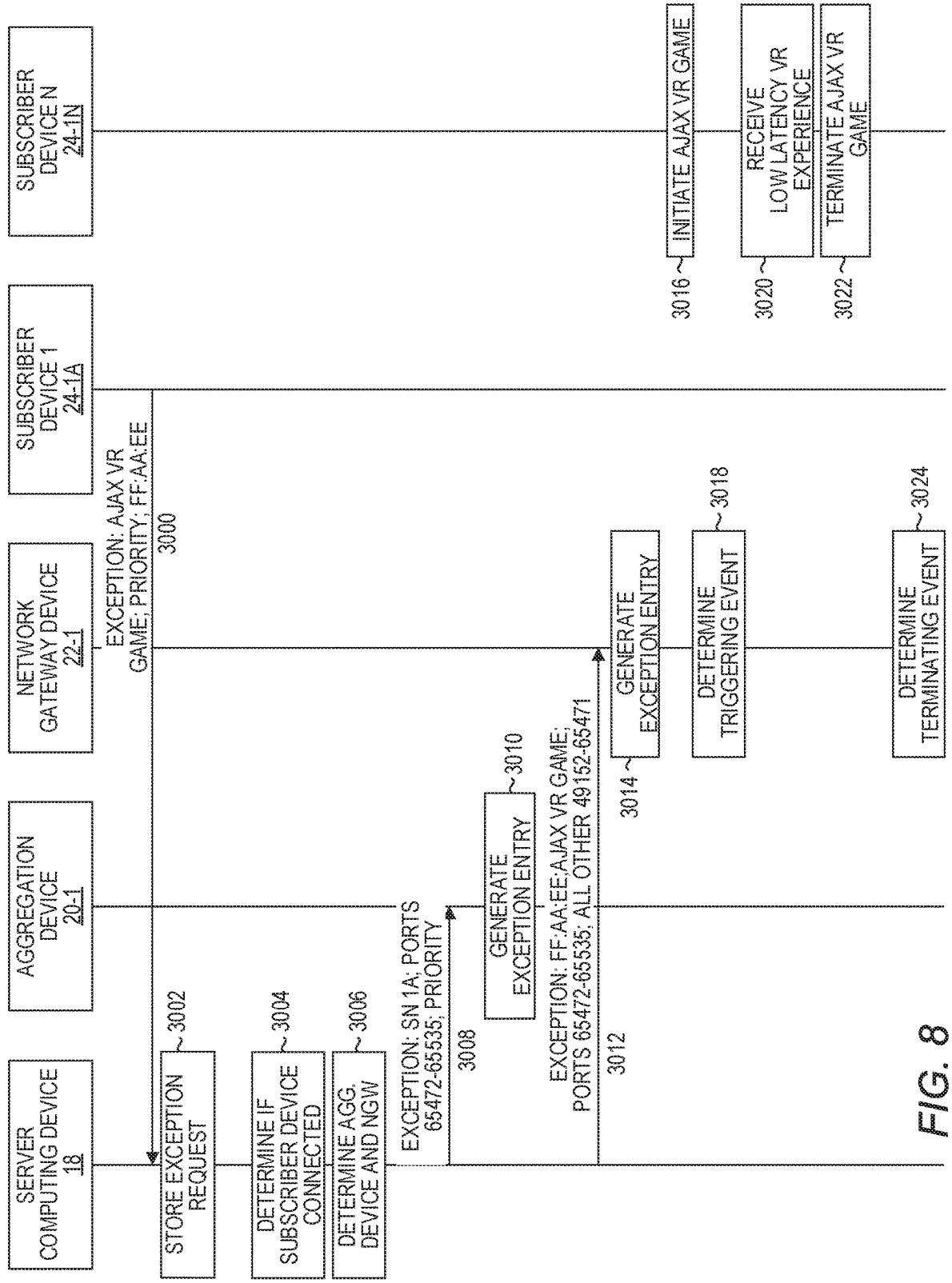
FIG. 8 is a message flow diagram illustrating a sequence of messages communicated among various components illustrated in FIG. 7, and actions taken by such components, according to one embodiment.

FIG. 7 is a simplified block diagram of the system 10 at a point in time when an exception to a network constraint is being granted according to another embodiment. All devices except the server computing device 18, the aggregation device 20-1, and those in the subscriber network 14-1A have been omitted from FIG. 7 solely due to space considerations. FIG. 8 is a message flow diagram illustrating a sequence of messages communicated among various components illustrated in FIG. 7, and actions taken by such components according to one embodiment. FIG. 8 will be discussed in conjunction with FIG. 7.

Referring first to FIG. 8, assume that the user 32 utilizes the user interface 37 (FIG. 3) to request that an exception be granted to a network constraint at a future point in time for a particular subscriber device 24. In particular, in this example, the user 32 has requested that the subscriber device 24-1N be granted an exception from priority network constraint imposed by the aggregation device 20-1 when processing packets. In particular, the aggregation device 20-1 typically treats all packet flows associated with the subscriber network 14-1A equally, and thus does not give any packet flows priority over any other packet flows. However, the user interface 37 allows the user 32 to request that packets associated with the subscriber device 24-1N be granted higher priority than other packet flows being processed by the aggregation device 20-1. Such prioritization likely reduces the latency of such packets.

The user interface 37 allows the user 32 to request an exception be granted on a date and time basis, as discussed above with regard to FIGS. 4-5, or, on an application/service basis. In this example, the user 32, via the user interface 37 of the subscriber device 24-1A, has requested that the exception be granted when the subscriber device 24-1N, a VR headset device, interacts with a virtual reality (VR) service, in particular an AJAX VR game. Latency in VR games can result in user dissatisfaction, and obtaining a higher priority for packet processing by the aggregation device 20-1 can reduce latency such that what might have been an unenjoyable experience becomes an enjoyable experience.

The subscriber device 24-1A sends the exception request to the server computing device 18 (FIG. 8, block 3000). The exception request identifies the AJAX VR game, a priority indicator, and information that identifies the subscriber device 24-1N, such as, by way of non-limiting example, the media access control (MAC) address of the subscriber device 24-1N.

The server computing device 18 receives the exception request and stores the exception request (FIG. 8, block 3002). In particular, referring now to FIG. 7, the server computing device 18 stores the exception request as an exception request entry 80 in the exception request table 54. The exception request entry 80 includes a field 82 that identifies the subscriber network 14-1A. The exception request entry 80 includes a field 84 that identifies the subscriber device 24-1N as the device that will be granted the exception, a field 86 that identifies the triggering event as interaction with the AJAX VR game, and a field 88 that identifies the exception that is to be granted (i.e., a prioritization exception).

Referring now to FIG. 8, the server computing device 18 accesses information, such as the network state data 58 to determine whether the subscriber device 24-1A is currently connected to a subscriber network 14-1A-14-ZM (FIG. 8, block 3004). For purposes of illustration, assume that the server computing device 18 determines that the subscriber device 24-1A is currently connected to the subscriber network 14-1A. The server computing device 18 accesses the network state data 58 and determines that the aggregation device 20-1 is the aggregation device for the subscriber network 14-1A and that the network gateway device 22-1 serves as the network gateway for the subscriber network 14-1A (FIG. 8, block 3006).

The server computing device 18 generates aggregation device instructions that include information suitable to identify the subscriber network 14-1A, to identify packets associated with the subscriber device 24-1N, and that include a priority indicator. In this example, the information for identifying the packets comprise a range of port numbers, 65472-65535; however, any suitable information may be utilized, such as packet flow identifiers, or the like. The server computing device 18 sends the aggregation device instructions to the aggregation device 20-1 (FIG. 8, block 3008).

The aggregation device 20-1 receives the aggregation device instructions and generates an exception entry (FIG. 8, block 3010). In particular, referring again to FIG. 7, the aggregation device 20-1 generates an exception entry 90 and stores the exception entry 90 in the exception table 68. In this example, the exception entry 90 includes a field 92 that identifies the subscriber network 14-1A, a field 94 that identifies the range of port numbers 65472-65535 that identify packets associated with the subscriber device 24-1N, and a field 96 that includes the priority indicator. It is again noted that in some embodiments, the aggregation device instructions may include two sets of port numbers, a first set of port numbers that identify packets associated with the subscriber device 24-1N, and a second set of port numbers that identify packets associated with every other subscriber device 24 connected to the subscriber network 14-1A other than the subscriber device 24-1N. In this embodiment, the aggregation device 20-1 may immediately begin prioritizing all packets from the subscriber network 14-1A that have a port number in the range of 65472-65535, to thereby prioritize those packets over all other packets, to thereby reduce latency of such packets. This is because the aggregation device 20-1 may not be aware of when the subscriber device 24-1N is executing the AJAX VR game. However, so long as the network gateway device 22-1 only uses the range of port numbers 65472-65535 to associate packets associated with the AJAX VR game when the AJAX VR game is executing on the subscriber device 24-1N, no such packets will be received by the aggregation device 20-1 until the AJAX VR game is being executed on the subscriber device 24-1N. In other embodiments, the aggregation device 20-1 may have an ability to detect when the AJAX VR game is being executed on the subscriber device 24-1N, or may be sent a message from the network gateway device 22-1 when the network gateway device 22-1 detects that the AJAX VR game is being executed on the subscriber device 24-1N, at which time the aggregation device 20-1 begins prioritizing all packets from the subscriber network 14-1A that have a port number in the range of 65472-65535.

Referring now to FIG. 8, the server computing device 18 generates gateway device instructions to associate packets associated with the subscriber device 24-1N with information for identifying the packets as being associated with the subscriber device 24-1N. In one embodiment, the information may comprise the same set of port numbers provided to the aggregation device 20-1, 65472-65535. The server computing device 18 sends the gateway device instructions to the network gateway device 22-1 (FIG. 8, block 3012). The network gateway device 22-1 receives the gateway device instructions and generates an exception entry (FIG. 8, block 3014). In particular, referring again to FIG. 7, the network gateway device 22-1 generates an exception entry 98 and stores the exception entry 98 in the exception table 74. In this example, the exception entry 98 includes a field 100 that identifies the subscriber device 24-1N and the AJAX VR game, and a field 102 that identifies the range of port numbers 65472-65535 that the network gateway device 22-1 is to use for all packets associated with the AJAX VR game when executing on the subscriber device 24-1N. In some embodiments, the gateway device instructions may include two sets of port numbers, a first set of port numbers that identify packets associated with the AJAX VR game when executing on the subscriber device 24-1N, and a second set of port numbers that identify packets associated with every other application executing on the subscriber device 24-1N, and associated with every other subscriber device 24 connected to the subscriber network 14-1A other than the subscriber device 24-1N.

The user 32, or some other individual, executes the AJAX VR game or otherwise interacts with the AJAX VR game from the subscriber device 24-1N (FIG. 8, block 3016). The network gateway device 22-1 detects the execution or interaction with the AJAX VR game as a triggering event (FIG. 8, block 3018). Thereafter, the network gateway device 22-1 associates packets associated with the AJAX VR game executing on the subscriber device 24-1N with one or more of the port numbers 65472-65535. The aggregation device 20-1 prioritizes all packets from the subscriber network 14-1A that have a port number in the range of 65472-65535, to thereby prioritize those packets over all other packets, to thereby reduce latency of such packets. Referring again to FIG. 8, the subscriber device 24-1N thus enjoys a low latency VR experience (FIG. 8, block 3020).

At a subsequent point in time, the user of the subscriber device 24-1N terminates the AJAX VR game (FIG. 8, block 3022). The network gateway device 22-1 determines that a terminating event has occurred and thus no longer associates any packets associated with the subscriber device 24-1N with a port number in the range of 65472-65535 (FIG. 8, block 3024).

Figure 9:
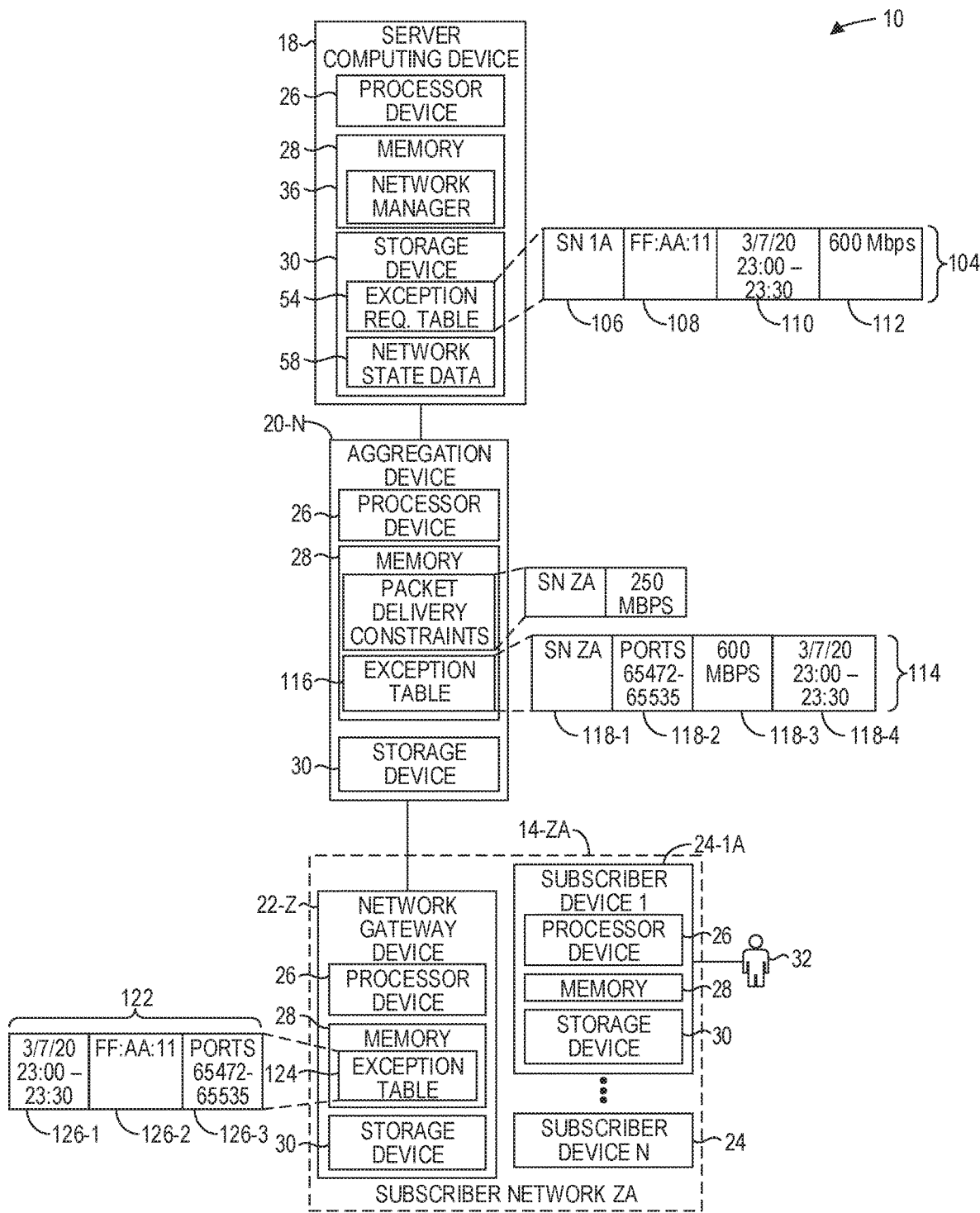
FIG. 9 is a simplified block diagram of the environment illustrated in FIG. 1 at a point in time when an exception to a network constraint is being granted according to another embodiment.
Figure 10A:
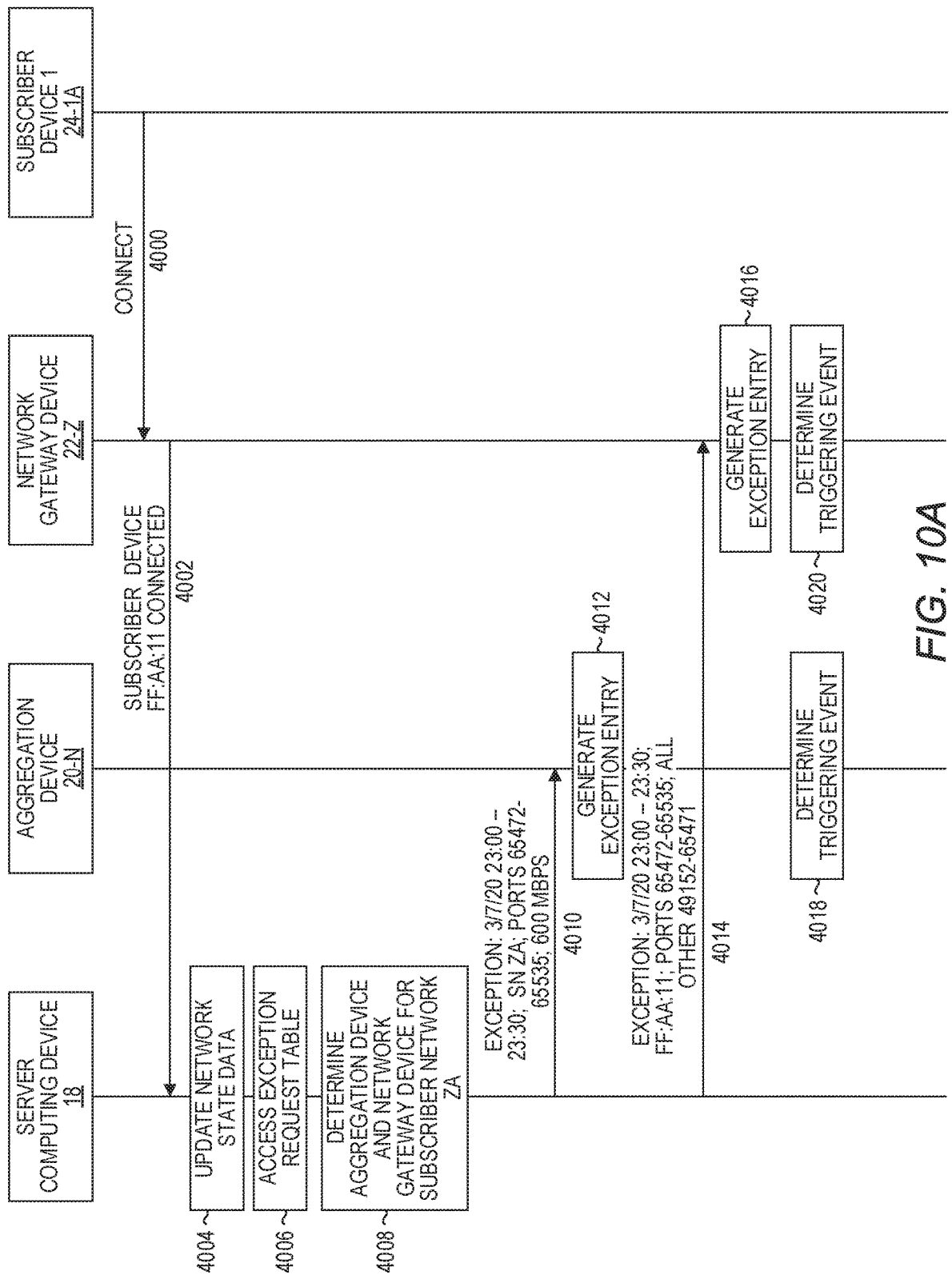
FIGS. 10A-10B illustrate a message flow diagram that depicts a sequence of messages communicated among various components illustrated in FIG. 9, and actions taken by such components, according to one embodiment.
Figure 10B:
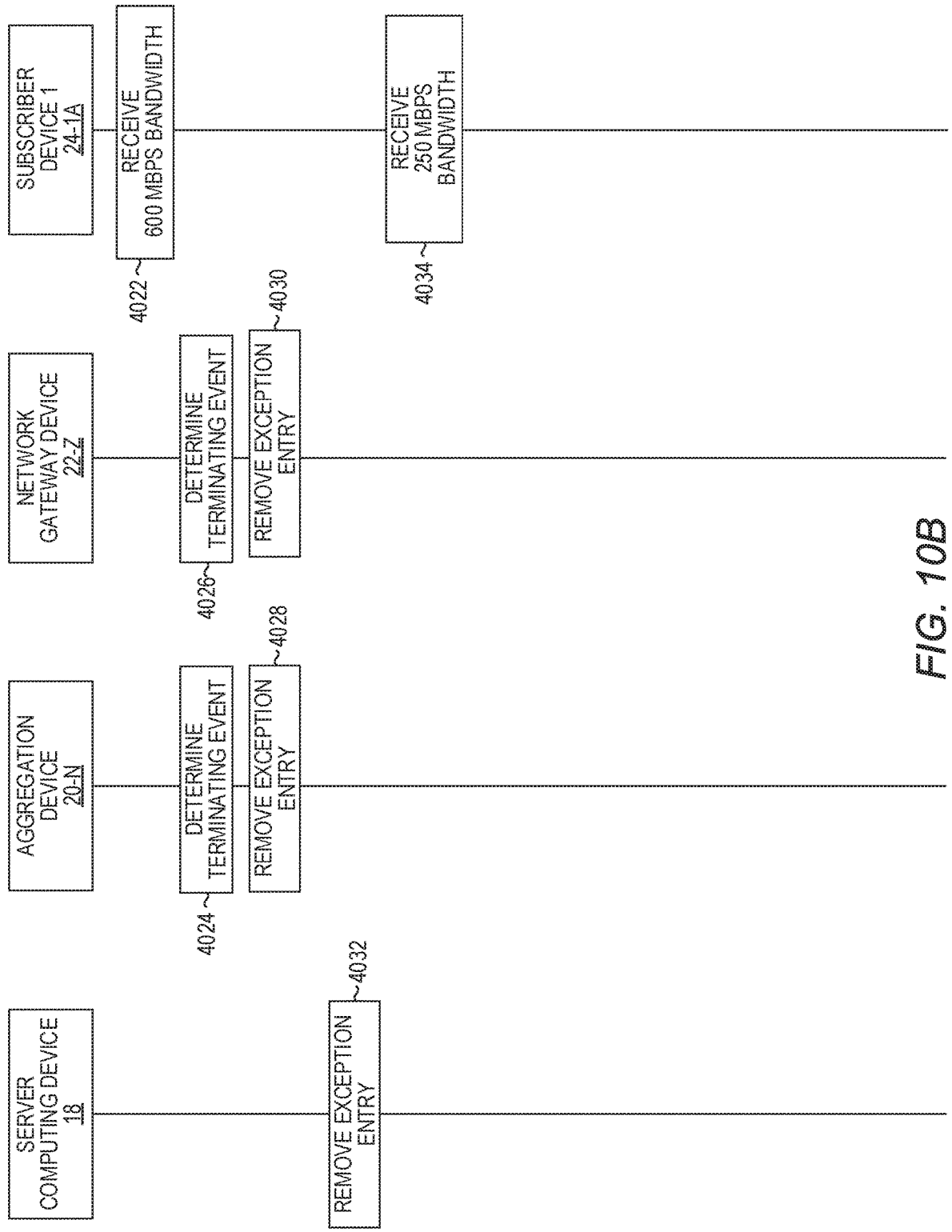

FIG. 9 is a simplified block diagram of the system 10 at a point in time when an exception to a network constraint is being granted according to another embodiment. All devices except the server computing device 18, the aggregation device 20-N, the subscriber device 24-1A and those in the subscriber network 14-ZA have been omitted from FIG. 9 solely due to space considerations. FIGS. 10A-10B illustrate a message flow diagram that depicts a sequence of messages communicated among various components illustrated in FIG. 9, and actions taken by such components according to one embodiment. FIGS. 10A-10B will be discussed in conjunction with FIG. 9.

Referring first to FIG. 10A, assume that the user 32 previously utilized the user interface 37 (FIG. 4) to request that an exception be granted to a network constraint at a future point in time and for a predetermined period of time for the subscriber device 24-1A. In particular, in this example, the user 32 previously requested that the subscriber device 24-1A be granted an exception from a 250 Mbps predetermined aggregate bandwidth constraint that is normally imposed upon the subscriber network 14-ZA. The user 32 has requested, via the user interface 37, that this exception be granted at 11:00 PM on Mar. 7, 2020 for 30 minutes, and has requested that the subscriber device 24-1A be granted a bandwidth of 600 Mbps for that period of time. The subscriber device 24-1A sent the exception request to the server computing device 18, similar as discussed above with regard to FIG. 4. The exception request identified the future point in time, the requested duration, the requested bandwidth, and information that identifies the subscriber device 24-1A, such as, by way of non-limiting example, the media access control (MAC) address of the subscriber device 24-1A. The server computing device 18 stored the exception request as an exception entry 104 in the exception request table 54 (FIG. 9). The exception entry 104 includes a field 106 that identifies the subscriber network 14-1A. The exception entry 104 includes a field 108 that identifies the subscriber device 24-1A as the device that will be granted the exception, a field 110 that identifies the date and time, and period of time during which the exception is to be granted (i.e., Mar. 7, 2020, 23:00-23:30), and a field 112 that identifies the exception that is to be granted (i.e., a bandwidth of 600 Mbps). The server computing device 18 then sent aggregation device instructions to the aggregation device 20-1 and sent gateway device instructions to network gateway device 22-1, similar as discussed above with regard to FIGS. 4-5.

In this embodiment, the subscriber device 24-1A is a mobile device, such as a computing tablet, a laptop computer, a smart phone, or the like. Referring now to FIG. 10A, at a subsequent point in time, the user 32 takes the subscriber device 24-1A to a colleague's home in which the subscriber network 14-ZA is located, and which receives service from the service provider network 12. The user 32 connects the subscriber device 24-1A to the subscriber network 14-ZA, such as by entering an appropriate Wi-Fi® password, and the subscriber device 24-1A receives an IP address on the subscriber network 14-ZA (FIG. 10A, block 4000). The network gateway device 22-Z sends a message to the server computing device 18 informing the server computing device 18 that the subscriber device 24-1A is now connected to the subscriber network 14-ZA (FIG. 10A, block 4002). The server computing device 18 updates the network state data 58 indicating that the subscriber device 24-1A is now connected to the subscriber network 14-ZA rather than the subscriber network 14-1A (FIG. 10A, block 4004).

The server computing device 18 also accesses the exception request table 54 and determines that the exception entry 104 corresponds to the subscriber device 24-1A (FIG. 10A, block 4006). The server computing device 18 determines via the network state data 58 that the aggregation device 20-N is the aggregation device for the subscriber network 14-ZA, and that the network gateway device 22-Z is the network gateway for the subscriber network 14-ZA (FIG. 10A, block 4008).

The server computing device 18 generates aggregation device instructions that include information suitable to identify the subscriber network 14-ZA, to identify packets associated with the subscriber device 24-1A, to identify the requested bandwidth, and the designated date, time and timeframe. In this example, the information for identifying the packets comprises a range of port numbers, 65472-65535; however, any suitable information may be utilized, such as packet flow identifiers, differentiated services code points (DSCPs), or the like. The server computing device 18 sends the aggregation device instructions to the aggregation device 20-N (FIG. 10A, block 4010).

The aggregation device 20-N receives the aggregation device instructions and generates an exception entry (FIG. 10A, block 4012). In particular, referring again to FIG. 9, the aggregation device 20-N generates an exception entry 114 and stores the exception entry 114 in an exception table 116 that maintains exceptions to network constraints for the subscriber networks 14 coupled to the aggregation device 20-N. In this example, the exception entry 114 includes a field 118-1 that identifies the subscriber network 14-ZA, a field 118-2 that identifies the range of port numbers 65472-65535 that identify packets associated with the subscriber device 24-1A, a field 118-3 that identifies the requested bandwidth, 600 Mbps, and a field 118-4 that identifies the designated date, time and timeframe. It is noted that in some embodiments, the aggregation device instructions may include two sets of port numbers, a first set of port numbers that identify packets associated with the subscriber device 24-1A, and a second set of port numbers that identify packets associated with every other subscriber device 24 connected to the subscriber network 14-ZA other than the subscriber device 24-1A.

Referring now to FIG. 10A, the server computing device 18 generates gateway device instructions to associate packets associated with the subscriber device 24-1A with information for identifying the packets as being associated with the subscriber device 24-1A. In one embodiment, the information may comprise the same set of port numbers provided to the aggregation device 20-N, 65472-65535. The server computing device 18 sends the gateway device instructions to the network gateway device 22-Z (FIG. 10A, block 4014). The network gateway device 22-Z receives the gateway device instructions and generates an exception entry (FIG. 10A, block 4016). In particular, referring again to FIG. 9, the network gateway device 22-Z generates an exception entry 122 and stores the exception entry 122 in an exception table 124. In this example, the exception entry 122 includes a field 126-1 that identifies the designated date, time and timeframe, a field 126-2 that identifies the subscriber device 24-1A, and a field 126-3 that identifies the range of port numbers 65472-65535 that the network gateway device 22-Z is to use for all packets associated with the subscriber device 24-1A. In some embodiments, the gateway device instructions may include two sets of port numbers, a first set of port numbers that identify packets associated with the subscriber device 24-1A, and a second set of port numbers that identify packets associated with every other subscriber device 24 connected to the subscriber network 14-ZA other than the subscriber device 24-1A.

If prior to the designated date and time, the subscriber device 24-1A disconnects from the subscriber network 14-ZA, the network gateway device 22-Z sends a message to the server computing device 18 indicating that the subscriber device 24-1A has disconnected. In response, the server computing device 18 sends revocation messages to both the network gateway device 22-Z and the aggregation device 20-N to revoke the exception. The network gateway device 22-Z deletes the exception entry 122, and the aggregation device 20-N deletes the exception entry 114.

For purposes of illustration, assume that the subscriber device 24-1A remains connected to the subscriber network 14-ZA. At the designated date and time, both the network gateway device 22-Z and the aggregation device 20-N determine that the triggering event has occurred based on the designated date and time (FIG. 10A, blocks 4018-4020). Thereafter, the network gateway device 22-Z utilizes one or more of the port numbers 65472-65535 for all traffic associated with the subscriber device 24-1A. The aggregation device 20-N allows all packets from the subscriber network 14-ZA that have a port number in the range of 65472-65535 to enjoy a 600 Mbps exception to the 250 Mbps predetermined bandwidth of the subscriber network 14-ZA. The aggregation device 20-N concurrently imposes an aggregate 250 Mbps on all other packet flows from the subscriber network 14-ZA utilizing port numbers other than 65472-65535. Referring now to FIG. 10B, the subscriber device 24-1A thus enjoys a 600 Mbps bandwidth for the period of time between 11:00 PM and 11:30 PM (FIG. 10B, block 4022).

At 11:30, both the network gateway device 22-Z and the aggregation device 20-N determine that a terminating event has occurred due to the lapsing of the predetermined period of time, in this example, thirty minutes (FIG. 10B, blocks 4024-4026). The aggregation device 20-N removes the exception entry 114 from the exception table 116 and stops providing a bandwidth exception to packets designated with information that associates such packets with the subscriber device 24-1A (FIG. 10B, block 4028). The network gateway device 22-Z removes the exception entry 122 from the exception table 124 (FIG. 10B, block 4030). The server computing device 18 may remove the exception request entry 104 from the exception request table 54 (FIG. 10B, block 4032). Thereafter, the subscriber device 24-1A is limited to the aggregate 250 Mbps bandwidth constraint associated with the subscriber network 14-ZA (FIG. 10B, block 4034).

Moreover, while the generation of a network constraint exception has been discussed solely in conjunction with the user interface 37 (FIG. 3), the embodiments are not limited to any particular mechanism for generating a network constraint exception. By way of non-limiting example, the network manager 36 may be configured with certain rules that cause network constraint exceptions to be granted to certain subscriber devices 24 automatically based on one or more criteria. As an example, the network manager 36 may be configured with a rule that grants any mobile subscriber device 24 that connects to any subscriber network 14-1A-14-ZM with a network exception, such as increased bandwidth. In some examples, the rule may be limited to certain characteristics of the mobile subscriber device 24, such as the manufacturer, or to attributes of the subscriber, such as a particular service subscribed to by the subscriber or other configuration information associated with the subscriber.

Figure 11:
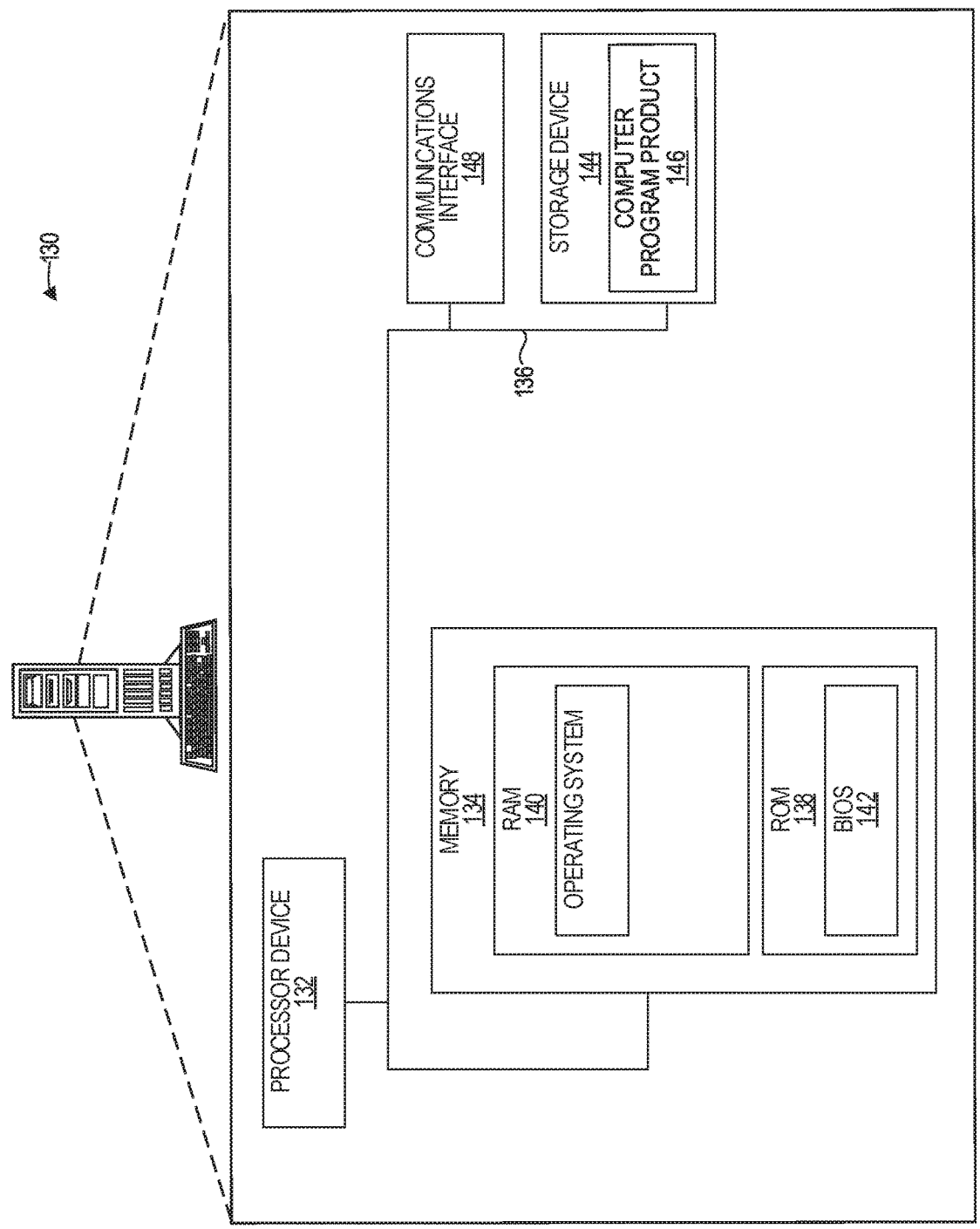
FIG. 11 is a block diagram of a computing device suitable for implementing one or more of the processing devices disclosed herein, according to one embodiment.

FIG. 11 is a block diagram of a computing device 130 that contains components suitable for implementing any of the processing devices disclosed herein. The computing device 130 includes a processor device 132, a system memory 134, and a system bus 136. The system bus 136 provides an interface for system components including, but not limited to, the system memory 134 and the processor device 132. The processor device 132 can be any commercially available or proprietary processor.

The system memory 134 may include non-volatile memory 138 (e.g., read-only memory (ROM), erasable programmable read-only memory (EPROM), electrically erasable programmable read-only memory (EEPROM), etc.), and volatile memory 140 (e.g., random-access memory (RAM)). A basic input/output system (BIOS) 142 may be stored in the non-volatile memory 138 and can include the basic routines that help to transfer information between elements within the computing device 130. The volatile memory 140 may also include a high-speed RAM, such as static RAM, for caching data.

The computing device 130 may further include or be coupled to a non-transitory computer-readable storage medium such as a storage device 144, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like.

A number of modules can be stored in the storage device 144 and in the volatile memory 140, including an operating system and one or more program modules, such as the network manager 36, which may implement the functionality described herein in whole or in part. All or a portion of the examples may be implemented as a computer program product 146 stored on a transitory or non-transitory computer-usable or computer-readable storage medium, such as the storage device 144, which includes complex programming instructions, such as complex computer-readable program code, to cause the processor device 132 to carry out the steps described herein. Thus, the computer-readable program code can comprise software instructions for implementing the functionality of the examples described herein when executed on the processor device 132. The processor device 132, in conjunction with the network manager 36 in the volatile memory 140, may serve as a controller, or control system, for the computing device 130 that is to implement the functionality described herein.

The computing device 130 may also include one or more communication interfaces 148, depending on the particular functionality of the computing device 130. The communication interfaces 148 may comprise one or more wired Ethernet transceivers, wireless transceivers, fiber, satellite, and/or coaxial interfaces, by way of non-limiting example.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
    determining, by a network manager executing on a computing device, that a subscriber device associated with a first subscriber network of a plurality of subscriber networks is to be granted an exception to a network constraint of the first subscriber network;
    sending, to an aggregation device that is coupled to a set of subscriber networks including the first subscriber network, aggregation device instructions to grant the exception to packets associated with the subscriber device that flow through the aggregation device, the aggregation device instructions including information that identifies the first subscriber network, information for identifying packets as being associated with the subscriber device, and a maximum bandwidth to be accorded the subscriber device; and
    sending, to a network gateway device that serves as a network gateway for the first subscriber network, gateway device instructions to associate packets associated with the subscriber device with information for identifying the packets as being associated with the subscriber device.

2. The method of claim 1 wherein the exception is to be granted upon a triggering event detected at a future point in time.

3. The method of claim 2 wherein the triggering event comprises a specified date and time.

4. The method of claim 3 wherein the network constraint comprises a predetermined bandwidth constraint associated with the first subscriber network, and wherein the exception comprises providing the subscriber device a bandwidth greater than the predetermined bandwidth constraint associated with the first subscriber network for a predetermined timeframe.

5. The method of claim 2 wherein the triggering event comprises an initiation of communications, by the subscriber device, with an identified service of a plurality of different services.

6. The method of claim 5 wherein the network constraint comprises a predetermined bandwidth constraint associated with the first subscriber network, and wherein the exception comprises providing the subscriber device a bandwidth greater than the predetermined bandwidth constraint associated with the first subscriber network while the subscriber device is communicating with the identified service.

7. The method of claim 1 wherein the information for identifying the packets as being associated with the subscriber device comprises a set of port numbers.

8. The method of claim 1 wherein the information for identifying the packets as being associated with the subscriber device comprises a packet flow identifier that identifies a packet flow associated with the subscriber device.

9. The method of claim 1 wherein the aggregation device comprises one of a cable modem termination system, a digital subscriber line access multiplexer, and a fiber aggregation node.

10. The method of claim 1 wherein the gateway device instructions identify the subscriber device and a set of port numbers.

11. The method of claim 1 further comprising:
    determining, by the network manager, that the subscriber device has connected to a second subscriber network of the plurality of subscriber networks;
    sending, to an aggregation device that is coupled to the second subscriber network, aggregation device instructions that indicate that packets associated with the subscriber device that flow through the aggregation device that is coupled to the second subscriber network be granted the exception; and
    sending, to a network gateway device that serves as a network gateway for the second subscriber network, gateway device instructions to associate the packets associated with the subscriber device with the information for identifying the packets as being associated with the subscriber device.

12. The method of claim 1 wherein the exception is granted upon a triggering event and for a period of time until a terminating event occurs, and further comprising:
determining that the terminating event has occurred; and
in response to determining that the terminating event has occurred:
sending, to the aggregation device, instructions that revoke the exception; and
sending, to the network gateway device, instructions that revoke the exception.

13. The method of claim 1 wherein the aggregation device instructions identify a first set of port numbers from a plurality of different port numbers that correspond to packets associated with the subscriber device, and a second set of port numbers that correspond to packets associated with every other device connected to the first subscriber network other than the subscriber device; and
wherein the gateway device instructions identify the subscriber device, the first set of port numbers, and the second set of port numbers, and information that instructs the network gateway device to associate all packets originating from the subscriber device with port numbers from the first set of port numbers, and to associate all packets originating from every other device connected to the first subscriber network other than the subscriber device with port numbers from the second set of port numbers.

14. A computing device, comprising:
a memory; and
a processor device coupled to the memory, the processor device configured to:
determine that a subscriber device associated with a first subscriber network of a plurality of subscriber networks is to be granted an exception to a network constraint of the first subscriber network;
send, to an aggregation device that is coupled to a set of subscriber networks including the first subscriber network, aggregation device instructions to grant the exception to packets associated with the subscriber device that flow through the aggregation device, the aggregation device instructions including information that identifies the first subscriber network, information for identifying packets as being associated with the subscriber device, and a maximum bandwidth to be accorded the subscriber device; and
send, to a network gateway device that serves as a network gateway for the first subscriber network, gateway device instructions to associate packets associated with the subscriber device with information for identifying the packets as being associated with the subscriber device.

15. A non-transitory computer-readable storage medium that includes instructions configured to cause a processor device to:
determine that a subscriber device associated with a first subscriber network of a plurality of subscriber networks is to be granted an exception to a network constraint of the first subscriber network;
send, to an aggregation device that is coupled to a set of subscriber networks including the first subscriber network, aggregation device instructions to grant the exception to packets associated with the subscriber device that flow through the aggregation device, the aggregation device instructions including information that identifies the first subscriber network, information for identifying packets as being associated with the subscriber device, and a maximum bandwidth to be accorded the subscriber device; and
send, to a network gateway device that serves as a network gateway for the first subscriber network, gateway device instructions to associate packets associated with the subscriber device with information for identifying the packets as being associated with the subscriber device.

16. The method of claim 1 wherein the aggregation device instructions identify a first set of port numbers from a plurality of different port numbers that correspond to packets associated with the subscriber device and
wherein the gateway device instructions identify the subscriber device, the first set of port numbers and information that instructs the network gateway device to associate all packets originating from the subscriber device with port numbers from the first set of port numbers.

* * * * *